US008477013B2

(12) United States Patent
Sarma et al.

(10) Patent No.: US 8,477,013 B2
(45) Date of Patent: Jul. 2, 2013

(54) METHOD AND SYSTEM FOR PERFORMING MOBILE RFID ASSET DETECTION AND TRACKING

(76) Inventors: Sanjay Sarma, Belmont, MA (US); Brian Subirama, Barcelona (ES)

( * ) Notice: Subject to any disclaimer, the term of this patent is extended or adjusted under 35 U.S.C. 154(b) by 1122 days.

(21) Appl. No.: 11/849,260

(22) Filed: Aug. 31, 2007

(65) Prior Publication Data

US 2008/0198001 A1   Aug. 21, 2008

Related U.S. Application Data

(60) Provisional application No. 60/841,382, filed on Aug. 31, 2006.

(51) Int. Cl.
*G08B 25/00* (2006.01)
(52) U.S. Cl.
USPC .......................................... 340/8.1; 340/572.1
(58) Field of Classification Search
USPC ............. 340/825, 825.36, 825.49, 10.1–10.6, 340/1.1, 572.1–572.9, 8.1, 568.5; 235/375–385
See application file for complete search history.

(56) References Cited

U.S. PATENT DOCUMENTS

| | | | | |
|---|---|---|---|---|
| 4,688,026 A | * | 8/1987 | Scribner et al. | 235/385 |
| 6,046,683 A | * | 4/2000 | Pidwerbetsky et al. | 340/10.4 |
| 6,396,413 B2 | * | 5/2002 | Hines et al. | 340/8.1 |
| 6,768,419 B2 | * | 7/2004 | Garber et al. | 340/572.4 |
| 7,378,968 B2 | * | 5/2008 | Wang et al. | 340/572.4 |
| 7,741,967 B2 | * | 6/2010 | Valeriano et al. | 340/539.11 |
| 2005/0247779 A1 | * | 11/2005 | Ohkubo et al. | 235/383 |

* cited by examiner

*Primary Examiner* — Brian Zimmerman
*Assistant Examiner* — James Yang
(74) *Attorney, Agent, or Firm* — Caesar, Rivise, Bernstein, Cohen & Pokotilow, Ltd.

(57) ABSTRACT

Systems and methods of using RFID tags and a mobile RFID reader device for determining a geographic position of assets within a prescribed region is provided. A method of inferring the geometric location of assets within a prescribed region comprises the steps of moving a mobile RFID reader through said prescribed region; wirelessly detecting, by the mobile RFID reader, a first RFID location transponder while moving through said prescribed region; wirelessly detecting, by the mobile RFID reader, at least one RFID asset tracking transponder while moving through said prescribed region; wirelessly detecting, by the mobile RFID reader, a second RFID location transponder while moving through said prescribed region; and determining the geographic location of assets associated with said at least one detected RFID asset tracking transponder based upon said detected first and second RFID location transponders and a known position and identification code of said first and second RFID location transponders.

13 Claims, 5 Drawing Sheets

METHOD AND SYSTEM FOR PERFORMING MOBILE RFID ASSET DETECTION AND TRACKING

CROSS-REFERENCE TO RELATED APPLICATIONS

This is a non-provisional application claiming benefit of previously filed provisional application Ser. No. 60/841,382 filed Aug. 31, 2006 entitled "Mobile RFID Asset Tracker" by Brian Subirana and Sanjay Sarma, which application is incorporated herein by reference in its entirety.

FIELD OF THE INVENTION

The present invention relates generally to wireless locating and tracking systems, and more particularly to locating and tracking physical assets within a specified geographic area.

BACKGROUND OF THE INVENTION

In the past, RF tags have been used in a limited capacity to track the location of assets. For example, near-field RF tags have been mounted on crates or pallets used in storage facilities. RF readers may be located at certain choke-points such as at the exits or entrances of the storage facilities and read the RF tags on the pallet and send the RF tag's identification to a central computer. However, due to their limited range and functionality, these RF tags offer only a verification of an asset's presence and do not provide the ability to track the geographic location of assets within storage facilities. Similar systems are in use with electronic article surveillance systems to prevent retail theft. Other prior art systems have employed transponders whose geometrical location can be estimated by 3D triangulation methods. A drawback of these techniques is that they are costly, on both the transponder and reader side.

It therefore remains an important and necessary function, with special concern to the retail industry, to be able to track the geographic location of assets within a region, in a cost effective manner. For example, the ability to track the geographic location of promotion displays, fixtures, floor models, inventory and collateral within a retail space remains an important objective of the retail industry.

When a retailer lays out displays, fixtures and inventory in a store, it follows a carefully designed planogram, which is a schematic drawing of fixtures that illustrate product placement. Non-compliance with these planograms can result in substantially lower performance and in lower customer satisfaction. A need, therefore, exists to be able to monitor configurations of these assets to assist retailers to verify and correct execution in individual stores.

SUMMARY OF THE INVENTION

The present invention addresses and resolves the above-identified, as well as other limitations, with a novel asset tracking system.

DESCRIPTION OF THE DRAWING FIGURES

These and other objects, features and advantages of the present invention will be apparent from a consideration of the following Detailed Description of the invention, when considered in conjunction with the drawing Figures, in which.

DETAILED DESCRIPTION OF THE PREFERRED EMBODIMENTS

Figure 1:
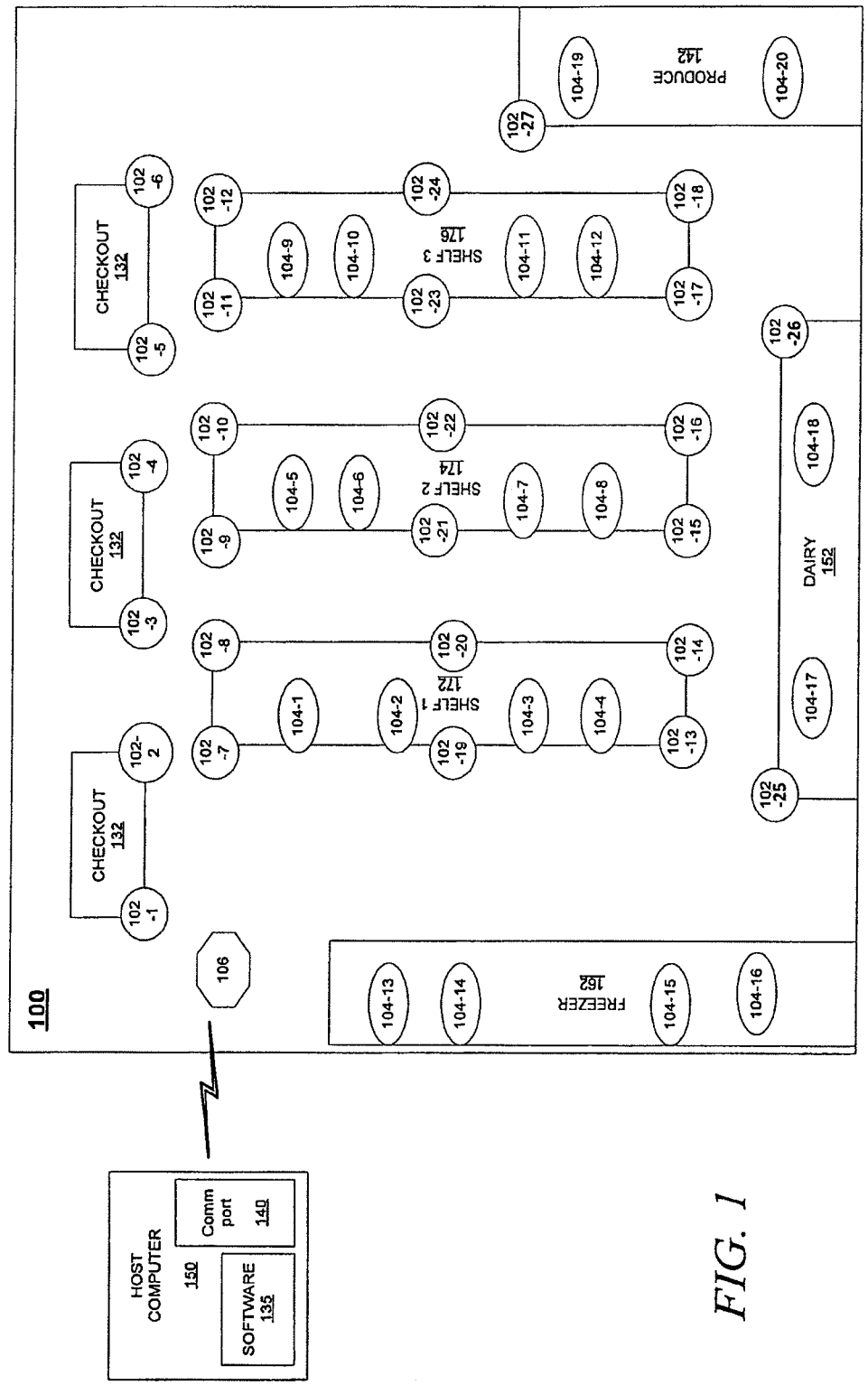
FIG. 1 is a block diagram of a mobile RFID asset tracking system according to a first embodiment of the present invention.

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention and are considered to be within the understanding of persons of ordinary skill in the relevant art.

Various descriptions of the structure and function of the embodiments is provided in this patent. However, as is understood by those skilled in the art, the performance of a given functionality may be distributed among one or more components, and conversely, multiple structures may be required to achieve a desired functionality. While the detailed descriptions herein have been provided with respect to certain allocations of functionality and structure to various items (such as elements of a block diagram or flowchart) the underlying inventions herein should not be limited to the allocation of those structures, functions, diagrammatic representations or labeling selected for expository convenience herein.

In the described embodiment, an asset tracking system is provided which not only infers whether assets are within a prescribed region (i.e., determine an asset's presence), but also infers the geometric location of assets within a defined region in a cost effective manner.

According to one aspect of the invention, a system for inferring the geometric location of assets within a defined region comprises a set of passive RF tags, divided by functional use into a first set of RF tags and a second set of RF tags. The first set of RF tags are referred to herein as asset identifier passive RF tags and the second set of tags are referred to herein as location beacon passive RF tags. The system further comprises a plurality of RFID reader/writers and a general purpose computer for managing the various apparatus including the RF tags and RFID reader/writer to infer the geometric location of assets within the prescribed region.

According to one aspect of the invention, a method for inferring the geometric location of assets within a defined region comprises the steps of moving at least one mobile RFID reader/writer through said prescribed region to interrogate RFID location transponders and RFID asset tracking transponders, distributed throughout said prescribed region, wirelessly detecting, by the mobile RFID reader, a first RFID location transponder while moving through said prescribed region; wirelessly detecting, by the mobile RFID reader, at least one RFID asset tracking transponder while moving through said prescribed region, subsequent to said detection of said first RFID location transponder; wirelessly detecting, by the mobile RFID reader, a second RFID location transponder while moving through said prescribed region, subsequent to said detection of said at least one RFID asset tracking transponder; and determining a location of assets affixed to said at least one detected RFID asset tracking transponder based upon identification information provided in accordance with said detection of said first and second RFID location transponders and a known position of said first and second RFID location transponders.

To carry out the method steps recited above, it is necessary, at a pre-operational stage to perform the following steps: placing a set of location beacon passive RF tags throughout the defined region, tagging assets located within the defined region with the asset identifier passive RF tags, manually recording the position of the location beacon passive RF tags placed throughout the defined region, According to one aspect of the invention, it is contemplated to integrate each mobile RFID reader with a process conducted on a daily basis in the defined region. For example, a given RFID reader device may be integrated with a vacuum or a replenishment cart, used daily in the defined region. In this manner, there is provided some degree of assurance that the entirety of the defined region is traversed on a particular day, thereby assuring that each location beacon RF tag reader is detected during the traversal.

A primary advantage of the invention is that it utilizes passive RFID tags and mobile readers, which are more cost effective than active RFID tags and choke-point readers, while providing the benefits of both.

Examples herein are illustrative and non-limiting. Like elements and steps as between Figures are indicated by like reference numerals.

I. Overview of the Mobile RFID Tracking System

Methods and systems provided herein improve processes and systems for inferring the geometric location of assets within a prescribed region. As will be described in greater detail below, an asset tracking system of the invention, according to one embodiment, infers the geometric location of assets within a prescribed region (e.g., retail space). A system comprises of a first set of passive near-field RFID tags, a second set of passive near-field RFID tags, a plurality of location aware mobile readers (location awareness can come from the person carrying a handheld reader or from automatic means like GPS) and a general purpose computer. The invention combines the features and capabilities of each device, in a unique way, to provide a capability for detecting the geographic location of assets in a cost effective and repeatable manner.

The invention is described herein with respect to the tracking of assets within a prescribed region. In one exemplary embodiment the assets are tracked within a prescribed region embodied as a retail space. While the invention is seen to have particular relevance to the retail service industry, it will be appreciated that the invention is not limited to the retail service industry but is equally applicable to other industries in which the tracking of assets within a defined region is a goal.

II. System Overview

FIG. 1 is a block diagram of a mobile RFID asset tracking system according to a first embodiment of the present invention. The system will be explained for use in a retail store, but is equally applicable in other locations or geographical areas. As shown in FIG. 1, the system includes a plurality of location beacon passive RFID (Radio Frequency Identification Devices) tags 102, referred to hereafter as RFID beacon location tags 102, a second plurality of asset identification passive RFID tags 104, referred to hereafter as RFID asset identification tags 104, a host computer 150 and a mobile reader/writer 106, all operatively coupled.

The host computer 150 includes a processing unit, a system memory and a system bus. The system bus couples system components including, but not limited to, the system memory to the processing unit. The processing unit can be any of various commercially available processors. Dual microprocessors and other multi-processor architectures may also be employed as the processing unit. The host computer 150 further includes an internal hard disk drive (HDD) (e.g., EIDE, SATA), which internal hard disk drive may also be configured for external use in a suitable chassis (not shown), a magnetic floppy disk drive (FDD), (e.g., to read from or write to a removable diskette) and an optical disk drive, (e.g., reading a CD-ROM disk or, to read from or write to other high capacity optical media such as the DVD). The hard disk drive, magnetic disk drive and optical disk drive can be connected to the system bus by a hard disk drive interface, a magnetic disk drive interface and an optical drive interface, respectively. The interface for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 150, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM, including an operating system, one or more application programs, other program modules and program data. All or portions of the operating system, applications, modules, and/or data can also be cached in the RAM. It is appreciated that the invention can be implemented with various commercially available operating systems or combinations of operating systems.

A user can enter commands and information into the computer 150 through one or more wired/wireless input devices, e.g., a keyboard and a pointing device, such as a mouse. Other input devices (not shown) may include a microphone, an IR remote control, a joystick, a game pad, a stylus pen, touch screen, or the like. These and other input devices are often connected to the processing unit through an input device interface that is coupled to the system bus, but can be connected by other interfaces, such as a parallel port, an IEEE 1394 serial port, a game port, a USB port, an IR interface, etc.

A monitor or other type of display device is also connected to the system bus via an interface, such as a video adapter. In addition to the monitor, a computer typically includes other peripheral output devices (not shown), such as speakers, printers, etc.

The host computer 150 is operable to communicate with any wireless device or entity operatively disposed in wireless communication via wireless communication port 140. In one embodiment, the host computer 150 communicates with the mobile reader/writer 106 using any well-known or envisioned wireless communication technology, including, for example, Wi-Fi and Bluetooth™ wireless technologies.

The RFID tags are preferably passive tags, however, in other embodiments, the RFID tags used may be, micro-RFID tags, macro RFID tags, nano-RFID tags, active tags, and semi-passive RFID tags or other suitable RFID tags which are capable of transmitting data to a RFID interrogation device, described below, which can act as a transceiver and receiver. Active RFID tags are tags that contain a battery and can transmit data to a reader. Passive RFID tags are tags that do not contain a battery and cannot transmit data unless interrogated by a RFID integration device. RFID tags can be write-read or read only tags. In one embodiment, the RFID tags are small integrated circuits connected to an antenna that can respond to an interrogating RF signal with simple identifying information, or with more complex signals depending on the size of the integrated circuit. RFID tags can be placed within or affixed to a product and/or product packaging. Such use of RFID tags provides real-time or substantially-real-time tracking of assets comprising a retail store inventory.

The mobile RFID interrogation reader/writer device 106 is configured to send radio frequency signals to the passive RFID beacon location tags 102 and the passive RFID asset identification tags 104, to interrogate them. It is appreciated that the RFID interrogation reader/writer device 106 operates as both a transmitter and receiver. Thus, an interrogation signal emitted by the mobile RFID interrogation reader/writer device 106 activates a tag so that it can respond to the mobile RFID interrogation reader/writer device 106 with the tag information. In this way the mobile RFID interrogation reader/writer device 106 operates as a data collection device by receiving data from the RFID tags. In embodiments that use active RFID tags containing a battery, an RF signal can be sent to the RFID interrogation device without having to first transmit an interrogation signal to the tag. The mobile RFID interrogation reader/writer device 106 operates in these scenarios simply as a receiver for collecting the transmitted data.

Referring again to FIG. 1, the retail floor is divided into a number of sections or regions such as, for example, a checkout section 132, a produce section 142, a dairy section 152, a freezer section 162 and shelving 172-174. The first plurality of RFID beacon location tags 102 are strategically placed throughout the retail floor space 100, attached to shelving and other structures at pre-determined fixed positions. Each RFID beacon location tag 102 is associated with a unique RF tag identifier ("Tag ID"). The second plurality of The RFID asset identification tags 104 are placed on various assets to be tracked and/or located throughout the retail floor space 100. For example, RFID asset identification tags 104 may be used to attach to retail floor space items including, for example, dairy items, produce, breads and cereals. Each RFID asset identification tag 104 is associated with a unique RF tag identifier ("Tag ID").

It should be understood that each of the plurality of RFID tags 102, 104 are conventional tags in the sense that they are extremely small and inconspicuous, although FIG. 1 has been drawn to exaggerate the size and location of the RFID tags 102, 104. Depending on the application, the RFID tags 102, 104 may store therein a retail SKU number, a unique serial number identifying the item, or both. Further, the RFID asset identification tags 104 may be coupled to an associated asset via any suitable means known to one of ordinary skill in the art. In accordance with one embodiment of the present invention, the RFID asset identification tags 104 may be adhesively affixed to the assets. For example, the asset tag may comprise a surface coating of epoxy or other glue adhesive enabling the tag to be affixed to an article, package, or package skid. In another embodiment, the RFID asset identification tags 104 may be printed onto the various assets.

It should also be understood that using a greater number of RFID location beacon tags 102 provides a finer granularity in determining the location of assets within a retail floor space 100.

III. Exemplary Mobile RFID Asset Tracking Application

Figure 2:
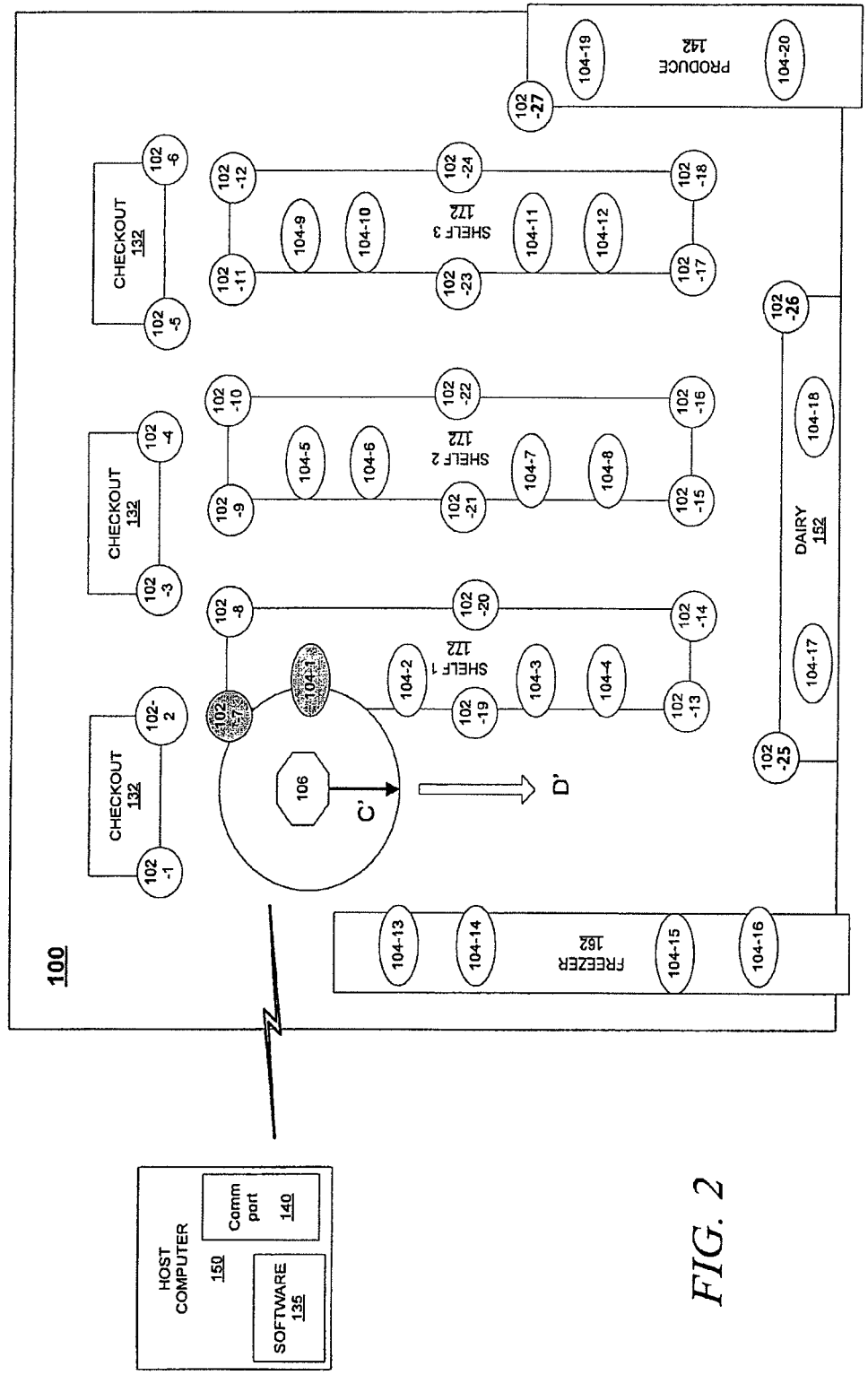
FIG. 2 is a block diagram of a mobile RFID asset tracking system of FIG. 1, including a mobile asset tracking device.

With reference now to FIG. 2, there is shown a block diagram of a mobile RFID asset tracking system, identical in most respects to the block diagram of FIG. 1, with the exception that FIG. 2 illustrates operational aspects of a mobile RFID reader/writer device 106.

Figure 3:
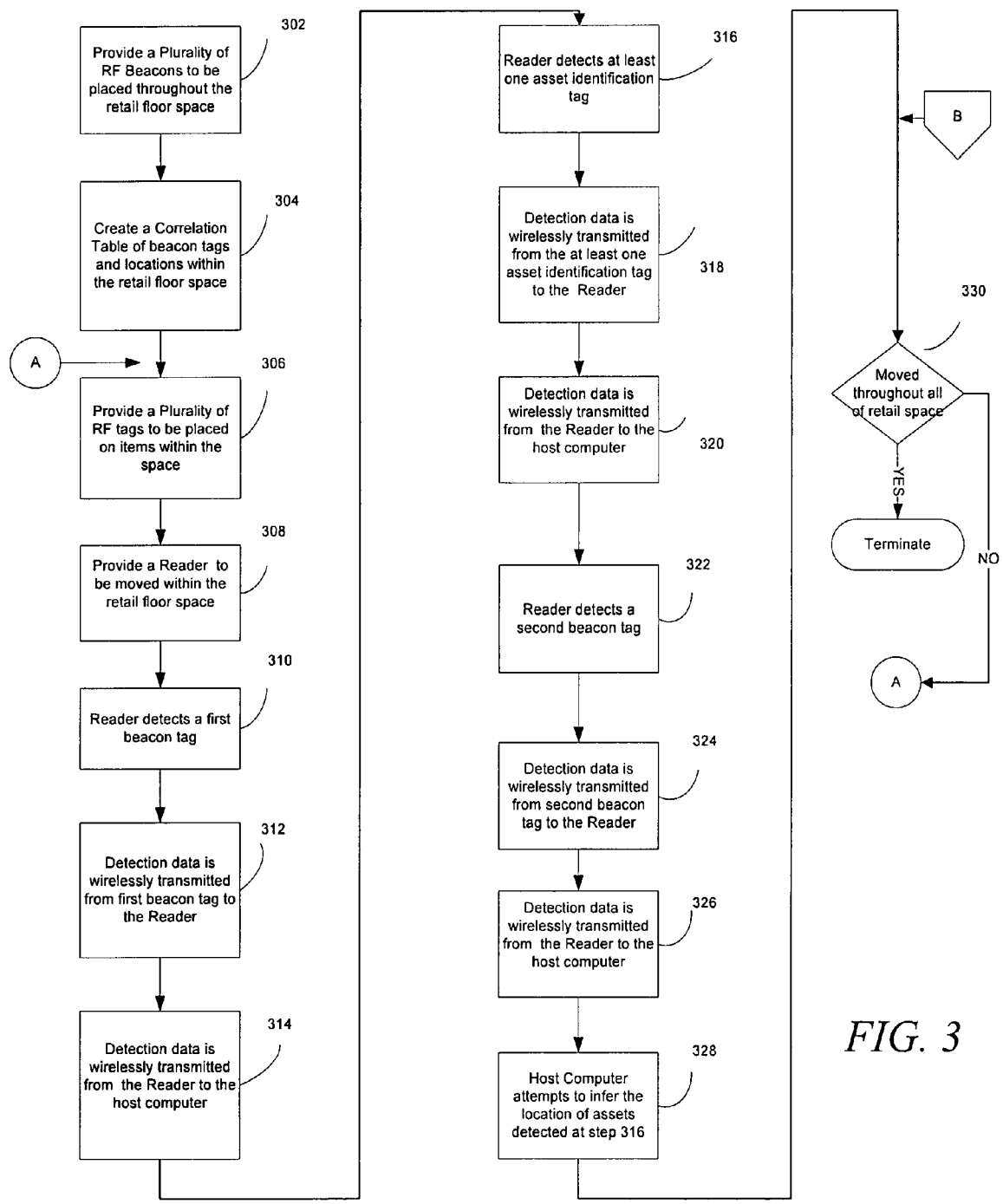
FIG. 3 is a flowchart illustrating steps of a method of for detecting the presence of and inferring the location of assets within a space tracking movement of a device through a space according to an embodiment of the invention.

With reference now to FIG. 3, there is described a process 300 for detecting the presence of and inferring the location of assets within a space. The process 300 can be considered to be comprised of two stages, a preparation stage and an operational stage.

Preparation Stage

At step 302, a set of RFID beacon location tags 102 are placed at strategic locations throughout the retail floor space 100.

At step 304, a correlation table is created, associating each beacon location tag's 102 ID with its corresponding strategically placed location on the retail floor space 100, as determined at step 302. Table I, illustrates an exemplary correlation table for use with the process 300.

TABLE I

| Location Beacon RF tag Identifier | Geographic Location on Grocery Floor |
|---|---|
| 1C3D43A | Shelf 1, southwest corner |
| 1C3D43B | Shelf 1, southeast corner |
| 1C3D43C | Shelf 1, northeast corner |
| 1C3D43D | Shelf 1, northwest corner |
| 1C3D53E | Shelf 2, southwest corner |
| 1C3D53F | Shelf 2, southeast corner |
| 1C3D53G | Shelf 2, northeast corner |
| 1C3D53H | Shelf 2, northwest corner |
| ... | ;;; |

At step 306, a set of RFID asset identification tags 104 are placed on various assets (e.g., shelf items, freezer items, dairy items and produce items) throughout the retail floor space 100. The tagged assets represent those assets which are to be tracked or located within the retail floor space 100.

Operational Stage

At step 308, an RFID mobile reader/writer device 106, having an associated read zone, C' is configured to move throughout the retail floor space 100. The read zone, C', is an interrogation zone within which an interrogation signal is sufficiently strong to detect an RF tag. In one embodiment, the movement direction and speed of the RFID mobile reader/writer 106 may be pre-programmed into a system memory. In some embodiments, the RFID mobile reader/writer device 106 may be manually moved through the retail floor space 100.

With continued reference to FIG. 2, in accordance with the instant example, the RFID mobile reader/writer 106 is shown moving in a direction D'(down a particular aisle of the retail floor space 100). As the RFID mobile reader/writer 106 moves in the direction D', it wirelessly detects any beacon location RFID tags and asset identification RF tags within its read zone, C' by reading response signals transmitted from the RFID tags present in a range determined by the read zone, C'.

At step 310, as the RFID mobile reader/writer 106 moves in the direction D', it detects a first RFID beacon location tag 102-7.

At step 312, the detection information transmitted from the first RFID beacon location tag 102-7 is wirelessly transmitted back to the RFID mobile reader/writer device 106 using an RFID protocol.

At step 314, the detection information obtained by the RFID mobile reader/writer device 106 from the first RFID beacon location tag 102-7 is wirelessly forwarded from the RFID mobile reader/writer device 106 to the host computer 150.

At step 316, as the RFID mobile reader/writer device 106 continues its movement in the direction D', it wirelessly and sequentially detects multiple RFID asset identification tags, namely, asset identification tags 104-1, 104-2, 104, 3 and 104-4, subsequent to the detection of the first RFID beacon location tag 102-7.

At step 318, as each of these RFID asset identification tags 104-1, 104-2, 104, 3, 104-4 are detected, their respective response signal information, including a unique tag ID and an indicia of signal strength, in an embodiment, is wirelessly transmitted back to the RFID mobile reader/writer device 106 using an RFID protocol.

At step 320, the detection information received from the RFID asset identification tags 104-1, 104-2, 104, 3, 104-4 is wirelessly forwarded from the RFID mobile reader/writer device 106 to the host computer 150.

At step 322, as the mobile reader 106 continues it movement in the direction D', it wirelessly detects a second beacon location tag 102-13, subsequent to the detection of the RFID asset identification tags 104-1, 104-2, 104, 3, 104-4 first RFID beacon location tag 102-7.

At step 324, the detection information emitted from the second beacon location tag 102-13 is wirelessly forwarded from the second beacon location tag 102-13 to the RFID mobile reader/writer device 106.

At step 326, the detection information is wirelessly forwarded from the RFID mobile reader/writer device 106 to the host computer 150.

At step 328, upon detecting the second beacon location tag 102-13, a software program 135, resident in host computer 150, attempts to infer the location of assets attached to the detected asset identification tags 104-1, 104-2, 104, 3 and 104-4.

At step 330, a determination step, it is determined whether the RFID mobile reader/writer device 106 has moved throughout the entire retail floor space. If so, the process terminates, otherwise the process returns to step 308.

It should be understood that in the case where the same beacon location tag is detected twice. For example, for a case in which beacon location tag A is detected, followed by the detection of one or more asset tags X, Y, Z, followed by a re-detection of location tag A, the location of the one or more detected asset tags X, Y, Z can be inferred.

Inferring the Location of Assets

Figure 4:
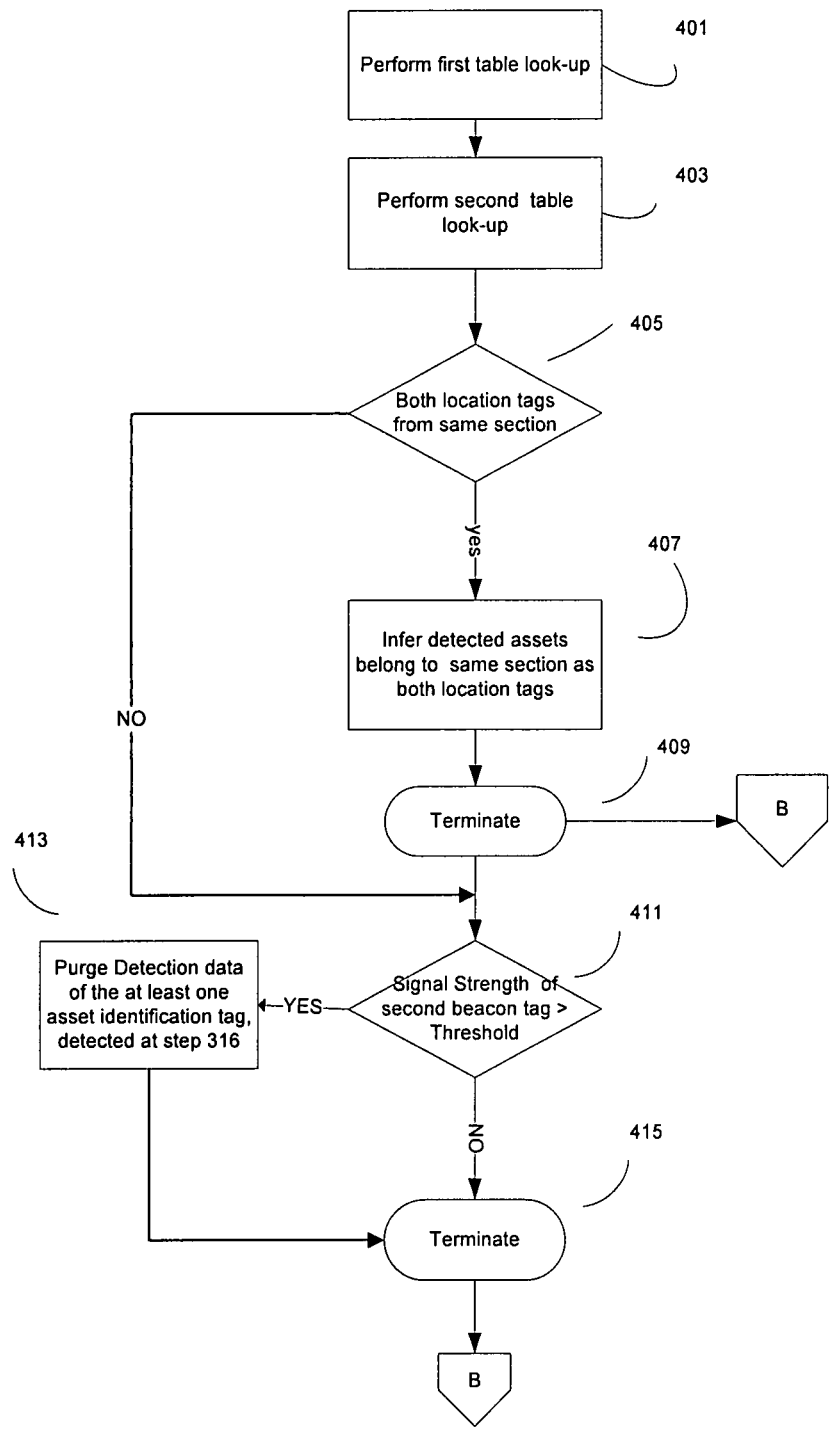
FIG. 4 is a flowchart illustrating, in greater detail, a process for inferring the location of assets within a space according to an embodiment of the invention.

With reference now to FIG. 4, there is shown a process 400 for inferring the location of assets within a retail floor space 100, in accordance with step 328 of process 300, described above. Process 400 is described in accordance with the instant example directed to attempting to infer the location of assets attached to the detected asset identification tags 104-1, 104-2, 104, 3 and 104-4, at step 328 of process 300.

At step 401, software program 135 of host computer 150 performs a table look-up using a previously created correlation table. Recall from step 304 above that correlation table I was created, associating each RFID beacon location tag's 102 "Tag ID" with its corresponding strategically placed location on the retail floor space 100. A first table look-up is performed using the response signal detection information provided from the first beacon location tag 102-7. More particularly, the "Tag ID" associated with the first detected beacon location tag 102, 7 (1C3D53G) is used as an index into correlation table I above to retrieve the tag's location on the retail floor space 100. In the example, the location of tag 102-7 is determined to be "Shelf 2, northeast corner" from the table look-up.

At step 403, a second table look up is performed, similar to that described immediately above at step 401. The second table look-up utilizes the Tag ID of RFID beacon location tag 102-13 to retrieve the location of this tag, which is determined to be "Shelf 2, southeast corner".

At step 405, a determination step, it is determined whether the two beacon location tag 102-7 and 102-13 are located in the same section of the retail floor space 100 based on the result of the first and second table look-ups. If so, the process continues at step 407, otherwise, the process continues at step 411.

At step 407, it can be reasonably inferred that the assets detected at step 318 above are all located on Shelf 2. This inference is supported by the fact that the associated asset identification tags 104-1, 104-2, 104, 3 and 104-4, are all located between the two beacon location tags 102-7 and 102-13, which were both determined to be associated with Shelf 2.

At step 409, the inferred location of the assets is recorded and process 400 terminates and process 300 continues at step 330.

At step 411, a determination is made regarding whether the strength of a signal received from the second location tag 102-13 is above a pre-determined threshold. If true, the process continues at step 415. If not true, the strength of the signal received from the second location tag 102-13 is determined to be below the pre-determined threshold and the detection is ignored as insignificant (noise) by virtue of the low signal strength.

At step 413, it is inferred that the detection was valid and consequently no determination or inference can be made regarding the location of assets associated with asset identification tags 104-1, 104-2, 104, 3 and 104-4. This inability to draw an inference results from the first and second beacon location tags being associated with different sections of the retail floor space 100.

At step 415, the process 400 terminates and returns to step 330.

It one embodiment, it is contemplated to integrate the mobile reader 106 within an everyday process associated with a typical retail store operation, such as a cleaning process or a replenishment process. By way of example, it is contemplated to integrate the mobile reader 106 within a vacuum, waxing machine or replenishment cart. In this manner, as a given device performs its intended functions, either under operator control, or autonomously, as in the Zoomba™ vacuum, the mobile reader 106 travels within close proximity (e.g., 5-10 feet) to each of the RFID beacon location tags 102 at some point. As the mobile reader 106 passes within a detectable proximity of the location 102 and asset identification 104 tags, ID information (i.e., "Tag IDs"), for both the RFID beacon location tags 102 and RFID asset identification tags 104 is transmitted back to the host computer 150. The simultaneous detection of these two tag types is used together with the a-priori information regarding the location of the RFID beacon location tags 102 to infer the geographic location of the tagged assets.

In one embodiment, the cleaning process or replenishment process guaranteed to be carried out properly by noting whether the mobile reader 106, integrated within the device, detects all of the RFID beacon location tags 102. In the case where all of the RFID beacon location tags are detected, it can be reasonably inferred that the cleaning or replenishment operation was carried out properly.

Figure 5:
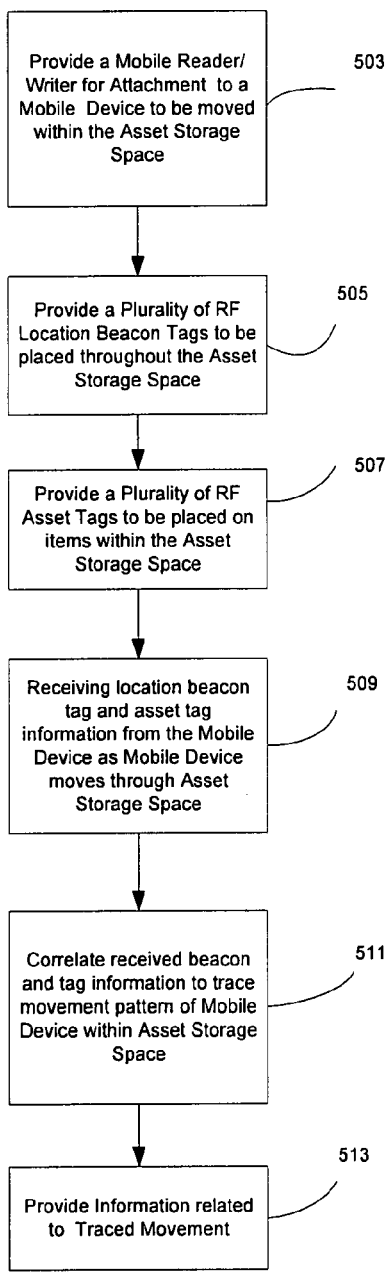
FIG. 5 is a flowchart illustrating steps of a method of automatically tracking the movement of a device through a space according to an embodiment of the invention.

FIG. 5 is a flowchart illustrating a process for ensuring that a cleaning or replenishment process is carried out properly.

At step 503, a Mobile Reader/Writer is provided for Attachment to a Mobile Device to be moved within an Asset Storage Space.

At step 505, a plurality of RF Location Beacon Tags are provided to be placed throughout the Asset Storage Space.

At step 507, a plurality of RF Asset Tags are provided to be placed on items within the Asset Storage Space At step 509, location beacon tag and asset tag information is received from the mobile device as the Mobile Device moves through the Asset Storage Space.

At step 511, the received beacon and tag information is correlated to trace movement patterns of the Mobile Device within the Asset Storage Space.

At step 513, Information is provided related to the traced movement patterns.

In another embodiment, in certain applications, it may be desirable to ensure that all of the RFID beacon location tags are being read. It is understood by those familiar with the detection arts that it is sometimes necessary for the mobile reader 106 to perform a so-called "wanding" operation to properly read certain RFID asset identification tags, which may be hard to read due to their location, such as those tags at the very bottom of a clothes display. To ensure that all of the RFID beacon location tags 102 are being properly read, it is contemplated to use a special set of fiducial or reference tags, which are intentionally placed in hard to read positions. If one or more of the fiducial tags are not read, it can be reasonably inferred that a mobile reader 106 operator is not performing the "wanding" operation properly. As one example, a specialized fiduciary RF tag may be placed below a pile of jeans. In the case where the specialized fiduciary RF tag is read, it can be reasonably assured that the operator is performing the wanding operation in a proper manner.

Figure 6:
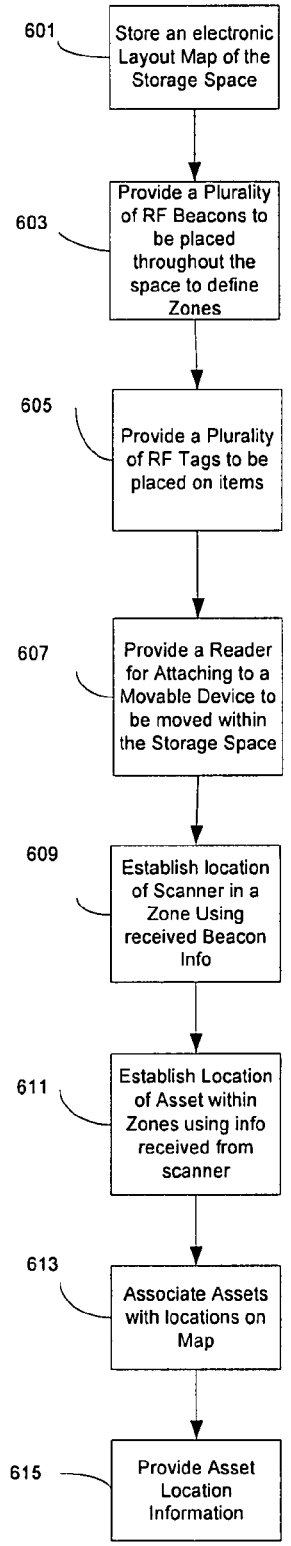
FIG. 6 is a flowchart illustrating steps of a method of detecting missing or depleted assets within a space according to an embodiment of the invention.

In one embodiment, it is contemplated to provide a method which overcomes the problem of detecting missing or depleted store stock. FIG. 6 illustrates this process. It is appreciated that for certain store items, tagging may not provide a cost effective solution. It is therefore contemplated to utilize a panogram of the retail space. Panograms, are schematic drawings of fixtures (store shelves) that illustrate product placement. In accordance with the present embodiment, an operator wearing a heads up display and operating a mobile reader 106, may view a panogram of the area of the store where he is she is currently located. The present operator location is displayable by virtue of the mobile reader 106, under operator control. A panogram compliance process for determining missing store stock may be performed by comparing a panogram of the store location, for the current operator position, in one eye of the heads up display and the operator viewing the area of the store where he is currently located through the other unaided eye. This allows the operator to compare, in real-time, the actual store stock situation with the panogram of the store stock as it should appear, via the heads up display.

While the invention has been shown and described with respect to particular embodiments, it is not thus limited. Numerous modifications, changes and enhancements will now be apparent to the reader.

What is claimed is:

1. A method for inferring relative locations of assets within a prescribed region, the method comprising:
   (a) providing a prescribed region having a plurality of assets disposed within said prescribed region and whose relative locations within said prescribed region are unknown;
   (b) disposing a first wireless communication beacon device within said prescribed region at a first location and disposing a second wireless communication beacon at a second location within said prescribed region, different from said first location, said disposing of said first and second wireless communication beacon devices defining a sub-region of said prescribed region that is located between said first and second wireless communication beacon devices;
   (c) associating respective wireless communication devices with each one of said plurality of assets to form a plurality of wireless communication asset tracking devices;
   (d) traversing said prescribed region to wirelessly detect said wireless communication beacon devices and at least one of said wireless communication asset tracking devices, said traversing comprising wirelessly detecting said first wireless communication beacon device, followed by detecting one or more wireless communication asset tracking devices, followed by detecting said second wireless communication beacon device; and
   (e) inferring that the relative locations of said one or more wireless communication asset tracking devices are within said sub-region.

2. A method according to claim 1, further comprising:
   (i) upon not satisfying said determining step (e), determining whether the strength of a signal received from said wireless communication beacon device is above a predetermined threshold;
   (ii) upon not satisfying said determining step (i), ignoring the detection of the second wireless communication beacon device; and
   (iii) upon satisfying said determining step (i), ignoring the detection of said wirelessly detected one or more wireless communication asset tracking devices.

3. A method according to claim 1, wherein said traversing is performed using a mobile radio frequency identification (RFID) reader/writer device.

4. A method according to claim 3, wherein said mobile RFID reader/writer device traverses said prescribed region under operator control.

5. A method according to claim 3, wherein said mobile RFID reader/writer device traverses said prescribed region autonomously.

6. A method according to claim 1, wherein each wireless communication beacon device and each wireless communication asset tracking device is a passive identification device.

7. A method according to claim 6, wherein each passive identification device is an RFID tag.

8. A method according to claim 1, wherein said step (d) of traversing said prescribed region, further comprises: continuously emitting an interrogation signal within a prescribed zone; receiving response signals from detected wireless communication beacon devices and wireless communication asset tracking devices in response to said emitted detection signal; forwarding said response signals to a remote host computer for processing therein.

9. A method according to claim 1, wherein said step of detecting said second wireless communication beacon device comprises said second wireless communication beacon device emitting a response signal that comprises at least a unique identification code and wherein said response signal from said second wireless communication beacon device comprises an indicia of response signal strength, and wherein said indicia is compared to a predetermined threshold.

10. A method according to claim 1, further comprising: building a correlation table correlating a known position of said first and second wireless communication beacon devices with an identification code.

11. A method according to claim 1, wherein said inferring step (e), further comprises: performing a table-lookup to determine if said first and second detected wireless communication beacon devices are associated with a same section of said prescribed region.

12. A method according to claim 11, wherein said look-up table is comprised of association pairs of wireless communication beacon devices and sections within said prescribed region.

13. An RFID Mobile asset tracking system, comprising:
(a) a mobile RFID reader/writer configured to transmit/receive signals within a prescribed transmission/reception zone while moving through a prescribed region,
(b) a plurality of RFID location transponders configured to receive a mobile RFID reader signal and generate location transponder response signals based thereon, each of said plurality of RFID location transponders positioned at a respective location within said prescribed region for detection by said mobile RFID reader/writer;
(c) a plurality of RFID asset tracking transponders configured to receive said mobile RFID reader signal and generate asset tracking transponder response signals based thereon for detection by said mobile RFID reader/writer, each one of said plurality of RFID asset tracking transponders being associated with a respective one of said assets and wherein each one of said assets is disposed within said prescribed region and whose relative location within said prescribed region is unknown;
(d) a host computer, remotely-located from said RFID reader/writer, communicatively coupled to said mobile RFID reader/writer to:
(i) receive said location transponder response signals and said asset tracking transponder response signals from said mobile RFID reader/writer,
(ii) infer relative locations of assets within said prescribed region based on receipt by said RFID reader/writer of a first location transponder response signal, followed by receipt of asset tracking transponder response signals, and followed by receipt of a second location transponder response signal; and
(iii) identify unique identification codes associated with each of said RFID location transponders and said RFID asset tracking transponders.

* * * * *

UNITED STATES PATENT AND TRADEMARK OFFICE
CERTIFICATE OF CORRECTION

PATENT NO. : 8,477,013 B2  
APPLICATION NO. : 11/849260  
DATED : July 2, 2013  
INVENTOR(S) : Sarma et al.

Page 1 of 1

It is certified that error appears in the above-identified patent and that said Letters Patent is hereby corrected as shown below:

In the Specifications  
Col. 2, line 3, the phrase "a method of for" should read "a method for".  
Col. 5, line 49, the phrase "second plurality of The RFID" should read "second plurality of RFID".  
Col. 7, line 18, the number label "104, 3" should read "104-3".  
Col. 7, line 22, the number label "104, 3" should read "104-3".  
Col. 7, line 28, the number label "104, 3" should read "104-3".  
Col. 7, line 34, the number label "104, 3" should read "104-3".  
Col. 7, line 46, the number label "104, 3" should read "104-3".  
Col. 7, line 65, the number label "104, 3" should read "104-3".  
Col. 8, line 28, the number label "104, 3" should read "104-3".  
Col. 8, line 46, the number label "104, 3" should read "104-3".  
Col. 9, line 52, the phrase "a panogram of the retail" should read "a planogram of the retail".  
Col. 9, line 52, the phrase "Panograms, are schematic" should read "Planograms, are schematic".  
Col. 9, line 56, the phrase "view a panogram" should read "view a planogram".  
Col. 9, line 59, the phrase "A panogram compliance" should read "A planogram compliance".  
Col. 9, line 61, the phrase "a panogram of the store" should read "a planogram of the store".  
Col. 9, line 66, the phrase "with the panogram" should read "with the planogram".

Signed and Sealed this  
Seventeenth Day of December, 2013

Margaret A. Focarino  
*Commissioner for Patents of the United States Patent and Trademark Office*